US005973431A

United States Patent [19]
Li et al.

[11] Patent Number: 5,973,431
[45] Date of Patent: *Oct. 26, 1999

[54] RELUCTANCE MACHINE WITH PERMANENT MAGNET ROTOR EXCITATIONS

[75] Inventors: Yue Li, St. Louis; Jerry Lloyd, Florissant, both of Mo.

[73] Assignee: Emerson Electric Co., St. Louis, Mo.

[*] Notice: This patent issued on a continued prosecution application filed under 37 CFR 1.53(d), and is subject to the twenty year patent term provisions of 35 U.S.C. 154(a)(2).

[21] Appl. No.: 08/661,056

[22] Filed: Jun. 10, 1996

[51] Int. Cl.⁶ .............................. H02K 21/14; H02K 1/27
[52] U.S. Cl. ......................... 310/168; 310/156; 310/165; 318/701
[58] Field of Search ..................... 310/168, 156, 310/44, 162, 166, 165; 318/701

[56] References Cited

U.S. PATENT DOCUMENTS

| | | | |
|---|---|---|---|
| 2,059,518 | 11/1936 | Harley | 310/156 |
| 3,061,805 | 10/1962 | Broderson | 310/168 |
| 3,671,788 | 6/1972 | Knudson et al. | 310/156 |
| 3,840,763 | 10/1974 | Baumann et al. | 310/156 |
| 4,127,786 | 11/1978 | Volkrodt | 310/156 |
| 4,315,171 | 2/1982 | Schaeffer | 310/49 R |
| 4,354,126 | 10/1982 | Yates | 310/156 |
| 4,405,873 | 9/1983 | Nondahl | 310/156 |
| 4,476,408 | 10/1984 | Honsinger | 310/156 |
| 4,486,678 | 12/1984 | Olson | 310/156 |
| 5,013,951 | 5/1991 | Stadnik et al. | 310/156 |
| 5,015,903 | 5/1991 | Hancock et al. | 310/168 |
| 5,038,065 | 8/1991 | Matsubayashi et al. | 310/162 |
| 5,191,256 | 3/1993 | Reiter et al. | 310/156 |
| 5,255,174 | 10/1993 | Murugan | 318/376 |
| 5,280,209 | 1/1994 | Leupold et al. | 310/156 |
| 5,304,882 | 4/1994 | Lipo et al. | 310/156 |

FOREIGN PATENT DOCUMENTS

| | | | |
|---|---|---|---|
| 7-39091 | 2/1995 | Japan | H02K 1/27 |
| 7-336919 | 12/1995 | Japan | 310/156 |
| WO 94/28618 | 12/1994 | WIPO | H02P 6/02 |

OTHER PUBLICATIONS

Geun–Hie Rim and Won–Ho Kim, "A Novel Converter Topology for Switched Reluctance Motor Dives Improving Efficiency and Simplifying Control Strategy," *Record of the 25th Annual IEEE Power Elcetronics Specialists Conference*, pp. 937–942, vol. 2, Jun. 20–24, 1994, Taipei, Taiwan.

Yuefeng Liao, et al., "A Novel Permanent Magnet Motor with Doubly Salient Structure," Sep./Oct. 1995, IEEE.

Yuefeng Liao, "Design and Performance Evaluation of a New Class of Permanent Magnet Motors with Doubly Salient Structure," Dec. 1992, Madison, Wisconsin.

Wen L. Soong et al., "Design of a New Axially–Laminated Interior Permanent Magnet Motor," *IEEE Transactions on Industry Applications*, pp. 358–367, vol. 31, No. 2, Mar./Apr. 1995.

Shigeo Morimoto et al., "Optimum Machine Parameters and Design of Inverter–Driven Synchronous Motors for Wide Constant Power Operation," *Proc. IEEE IAS Annual Meeting*, pp. 177–182, Denver, Colorado, 1994.

Bimal K. Bose, "A High–Performance Inverter–Fed Drive System of an Interior Permanent Magnet Synchronous Machine," *IEEE Transactions on Industry Applications*, pp. 987–997, vol. 24, No. 6, Nov./Dec. 1988.

(List continued on next page.)

*Primary Examiner*—Nestor Ramirez
*Assistant Examiner*—Burt Mullins
*Attorney, Agent, or Firm*—Arnold, White & Durkee

[57] ABSTRACT

A reluctance machine system including a reluctance machine having a stator including at least one phase winding and a rotor defining rotor poles and inter-pole gaps, where permanent magnet inserts are positioned within the inter-pole gaps to interact with the currents in the phase windings to provide permanent magnet torque and to improve the machine's performance.

21 Claims, 6 Drawing Sheets

OTHER PUBLICATIONS

Thomas M. Jahns, "Flux–Weakening Regime Operation of an Interior Permanent–Magnet Synchronous Motor Drive," *IEEE Transactions on Industry Applications,* pp. 681–689, vol. IA–23, No. 4, Jul./Aug. 1987.

Tomy Sebastian et al., "Operating Limits of Inverter–Driven Permanent Magnet Motor Drives," *IEEE Transactions on Industry Applications*, pp. 681–689, vol. IA–23, No. 2, Mar./Apr. 1987.

Thomas M. Jahns et al., "Interior Permanent–Magnet Synchronous Motors for Adjustible–Speed Drives," *IEEE Transactions on Industry Applications*, pp. 738–747, vol. IA–22, No. 4, Jul./Aug. 1986.

Stephenson et al. "The Characteristics, Design and Applications of Switched Reluctance Motors and Drives" PCIM Conference & Exhibition, Nuernberg, Germany, Jun. 21–24, 1993, pp. 20–22.

RELUCTANCE MACHINE WITH PERMANENT MAGNET ROTOR EXCITATIONS

FIELD OF THE INVENTION

This invention relates to reluctance machines and machine systems and, in particular, to switched reluctance machines and machine systems. More specifically, the present invention relates to a method and apparatus for improving the performance of a switched reluctance machine through the use of permanent magnet rotor excitations.

BACKGROUND OF THE INVENTION

In general, a reluctance machine is an electric machine in which torque is produced by the tendency of a movable part to move into a position where the inductance of an energized phase winding is maximized. In one type of reluctance machine the energization of the phase windings occurs at a controlled frequency. These machines are generally referred to as synchronous reluctance machines. In another type of reluctance machine, circuitry is provided for detecting the position of the movable part (generally referred to as a "rotor") and energizing the phase windings as a function of the rotor's position. These types of machines are generally known as switched reluctance machines. The present invention is applicable to both synchronous and switched reluctance machines.

The general theory of the design and operation of reluctance machines in general, and switched reluctance machines in particular, is known in the art and is discussed, for example, in Stephenson and Blake, "The Characteristics, Design and Applications of Switched Reluctance Motors and Drives", Presented at the PCIM '93 Conference and Exhibition at Nuremberg, Germany, Jun. 21–24, 1993.

As explained above, the basic mechanism for torque production in a traditional reluctance motor is the tendency of the rotor to move into a position to increase the inductance of the energized phase winding. In general, the magnitude of the torque produced by this mechanism corresponds to the magnitude of the current in the energized phase winding such that the motor torque is heavily dependent on the phase current waveforms. For an ideal traditional reluctance motor with no magnetic saturation, the instantaneous torque T, per phase, is:

$$T = 1/2 i^2 \frac{dL}{d\theta}$$

Where i is the instantaneous current in the energized phase winding and $dL/d\theta$ is the derivative of the phase inductance L with respect to the rotor position $\theta$. While all practical reluctance motors have some magnetic saturation, this equation is useful for purposes of the present analysis.

Because torque production in a traditional reluctance machine is almost exclusively a function of the current flowing in the phase winding, the power drives that are coupled to a traditional reluctance machine are required to have a rating corresponding to the highest expected torque output, and thus the highest expected phase current. This requirement often increases the costs of the power drives that must be used in conjunction with a given reluctance machine.

Alternately, when the costs of the power drives is a limiting function, the maximum torque output available from a traditional reluctance machine is limited by the maximum current rating of the available power converter. This current limit effectively limits the maximum available torque output from the machine.

It is an object of the present invention to overcome these and other limitations of traditional reluctance machines by, among other things, providing a reluctance machine system that allows for greater torque production for a given machine/power converter power rating, or conversely, allows the same torque to be produced with a lower phase current level, thus requiring a lower rated, and less costly, power converter. Moreover, it is a further object of the present invention to achieve these results with a machine that is rugged and easy to manufacture.

SUMMARY OF THE INVENTION

In accordance with an exemplary embodiment of the present invention a reluctance machine system is provided that comprises a reluctance machine having a stator defining a plurality of stator poles, a plurality of phase windings wound around the stator poles, and a rotor defining rotor poles and inter-pole gaps. Permanent magnet inserts are affixed within the inter-polar gaps. These permanent magnets provide auxiliary rotor excitations and interact with the current flowing in the phase windings of the machine to produce torque; such that the torque output of the reluctance machine is a function both of the phase current interacting with the traditional rotor poles, and the phase current interacting with the permanent magnets on the rotor. These two sources of torque allow for a greater torque output for a given phase current that was previously available from traditional reluctance machines.

A further aspect of the present invention comprises various power drives that are used to drive reluctance machines having permanent magnets positioned within inter-pole gaps as described above. The novel power drives of the present invention provide for both bi-directional and uni-directional currents that may be controlled, both in magnitude and phasing, to provide controlled torque output.

BRIEF DESCRIPTION OF THE DRAWINGS

Similar reference characters indicate similar parts throughout the several views of the drawings.

DETAILED DESCRIPTION OF THE INVENTION

Figure 1:
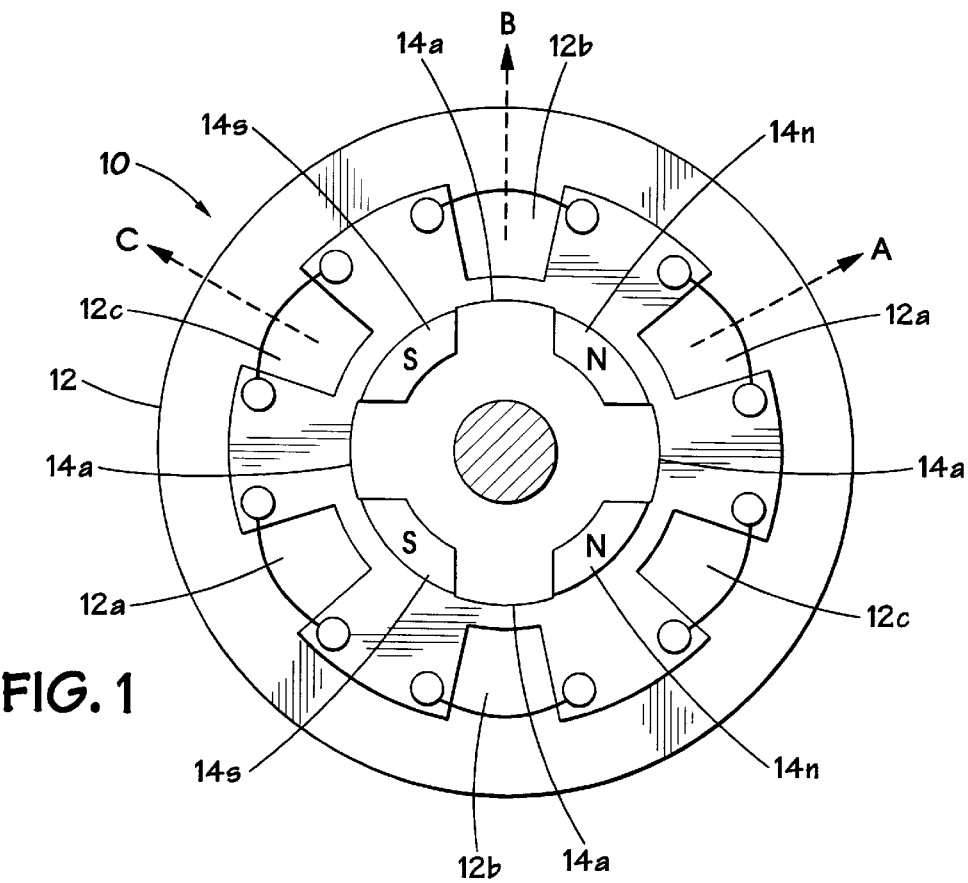
FIG. 1 illustrates a cross-sectional view of an exemplary reluctance machine in accordance with the present invention.

Turning to the drawings and, in particular FIG. 1, a cross sectional view of a reluctance machine 10 in accordance with the present invention is provided. In general, the machine 10 comprises a stator 12 and a rotor 14 positioned within the stator in such a way that it is free to rotate within the stator.

The stator 12 may be constructed from a stack of identical steel stator laminations in accordance with standard reluctance machine techniques. In the exemplary embodiment of FIG. 1, the stator defines six inwardly projecting stator poles. The six pole stator 12 of FIG. 1 is exemplary only, as alternate embodiments of the present invention having greater or fewer than six stator poles are envisioned.

Coils of three phase windings A, B and C are positioned around the six stator poles so as to define three stator pole pairs 12a, 12b, and 12c. The coils of the phase windings A, B and C are positioned such that the magnetic fields established when unidirectional current flows in the phase windings, in the same direction, have an orientation corresponding to the arrows A, B and C of FIG. 1. For example, the coils may be positioned such that, when current flows in a given direction through all three phase windings A, B and C, the tips of the arrows would be the north poles of the respective magnetic fields. Conversely the tips could be the south poles.

In FIG. 1, the coils of the three phase windings are schematically illustrated by a single winding turn. As those of ordinary skill in the art will appreciate, the coils may, and typical will, consist of a number of winding turns. The precise number of winding turns per coil will vary from application to application and can be selected according to known design methods.

For optimum performance the annular arc spanned by each stator pole 12 defined as θd should be approximately Π/Ps where Ps is the number of stator poles. In the example of FIG. 1, since Ps is 6, each stator pole spans Π/6 or 30° mechanical degrees.

The construction of stator 12 and phase windings A, B and C to meet the above criteria is well within the ability of one of ordinary skill in the art having the benefit of this disclosure and will not be discussed further herein.

In a preferred embodiment, the rotor 14 comprises a stack of substantially identical steel laminations that define four outwardly projecting stator poles 14a and four "inter-pole" gaps. Positioned within the inter-pole gaps are permanent magnets including permanent magnets 14n, having a north-pole magnetic polarity, and permanent magnets 14s, having a south-pole magnetic polarity.

Various means may be used to affix and hold the permanent magnets 14s and 14n in the inter-pole regions of rotor 14. For example, the permanent magnets 14n and 14s may be glued, epoxied or affixed in any other suitable binding fashion to the rotor 14. Alternately, the permanent magnets may be positioned within the inter-pole gaps and a non-conductive, non-magnetic sleeve may be placed over or around the entirely of the rotor/permanent magnet assembly. Still further, tangs or other similar structures may be formed in the rotor and the permanent magnet inserts such that the inserts are held in the inter-pole regions by the tangs. Even further, bands may be placed around the rotor/permanent magnet assembly, or a combination of the above listed methods could be used.

The precise manner in which the permanent magnet inserts 14n and 14s are positioned and held within the inter-pole gaps is not critical to proper operation of the machine 10 of FIG. 1 as long as the permanent magnet inserts 14n and 14s are sufficiently secure that they will not move or shift during the normal operation of the machine.

Preferably, the outer contour of the permanent magnet inserts 14n and 14s should conform as closely as possible to the curvature of the outermost portions of the rotor poles 14a such that the outer surface of the rotor/permanent magnet insert assembly is contiguous and smooth. This arrangement will reduce windage losses that would otherwise occur.

Because the rotor 14 of the motor of FIG. 1 includes traditional rotor poles 14a and permanent magnet poles 14n and 14s, the torque output of the machine 10 will have components provided by the interaction of the current in the phase windings A, B and C with the rotor poles 14a (the "reluctance" torque) and a component provided by the interaction of the current in the phase windings A, B and C with the permanent magnets 14n and 14s (the "permanent magnet" torque). In general, the per-phase torque output of the machine 10 may be expressed mathematically by the following relationship:

$$T = Tpm + Trel = i\frac{d\phi_{pm}}{d\theta} + 1/2 i^2 \frac{dL}{d\theta}$$

Where i is the instantaneous current in the energized phase winding, where $$\frac{d\phi_{pm}}{d\theta}$$

is the derivative of the flux linkage between the magnetic field of the permanent magnet on the rotor and the energized phase winding with respect to the rotor position θ, and dL/dθ is the derivative of the phase inductance L with respect to the rotor position θ.

As the above equation makes clear, for a positive $$\frac{d\phi_{pm}}{d\theta}$$

and positive current i, the torque output of the machine 10 will be greater for a given phase current than it would otherwise be for a traditional reluctance machine without permanent magnets affixed to the rotor. Alternately, a lower current i can be used to produce the same torque output since there is a permanent magnet torque contribution.

One benefit of the machine 10 over other rotating machines having permanent magnets on the rotating part of the machine is that it is relatively easy and inexpensive to construct because of the concentrated nature of the switched reluctance phase windings and the simple construction of both the rotor and the stator.

Figure 2:
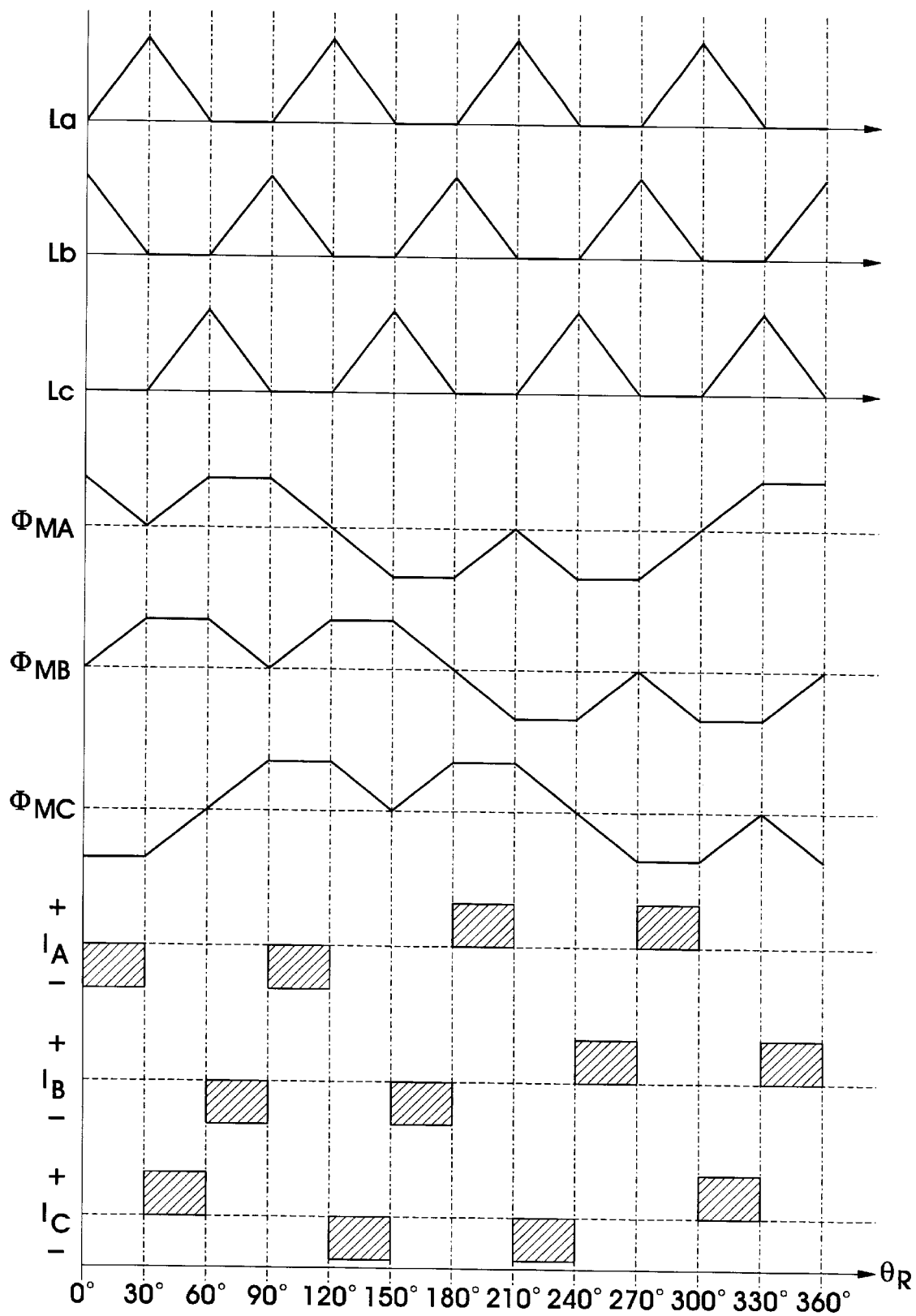
FIG. 2 illustrates exemplary inductance, magnetic flux and current waveforms for the machine of FIG. 1.

As the above indicates, the total torque output of the machine 10 of FIG. 1 will be greater than would otherwise be for a traditional reluctance machine as long as $$i\frac{d\phi_{pm}}{d\theta}$$

is positive. The polarity of $$i\frac{d\phi_{pm}}{d\theta}$$

will depend on the direction of the current in the phase winding of interest as well as the polarity of the permanent magnet 14n, 14s interacting with the energized phase winding. Because there are permanent magnets of both polarities affixed to the rotor 14, it is necessary to have bi-directional currents to produce maximum torque output. FIG. 2 illustrates one switching scheme that may be used with the machine 10 of FIG. 1 to produce maximum torque output.

Referring to FIG. 2, the inductance L, permanent magnet flux linkage Φpm and desired phase current i, for the three phases windings A, B and C of the machine 10 of FIG. 1 are illustrated as a function of rotor position θ. The various parameters are illustrated with equal divisions corresponding to the stator pole span $\theta_d$. As may be noted, in the preferred embodiment, the inductance profiles take the form of triangles as is traditional with reluctance machines that increase for one stator pole span, decrease to zero the next and remain at zero for yet a third. The permanent magnet flux linkages waveforms, however, are of a different form and, because there are north and south polarity magnets 14n and 14s affixed to rotor 14, vary from positive to negative.

To produce the maximum desired reluctance torque it is essential to energize each phase winding when the inductance for that winding is increasing. Using phase winding A as an example, the inductance for that winding is increasing during the intervals defined by rotor positions 0°–30°, 90°–120°, and 180°–210°. Thus, the switching scheme of FIG. 2 illustrates current in phase winding A for each of these intervals. Because the reluctance torque is a function of the square of the current, the polarity of the current flowing in winding A during these intervals is not critical to the production of maximum torque.

The polarity of the current is, however, important for the production of permanent magnet torque. Thus, to allow for the maximum production of permanent magnet torque, the polarity of the currents flowing through the phase windings during the intervals of increasing inductance is controlled to be of the same polarity of the slope of the permanent magnet flux curves for that winding during those intervals. Again, using phase A as an example, during the intervals 0°–30° and 90°–120° the permanent magnet flux for that phase winding is decreasing. As such, to provide positive magnetic torque during those intervals, the current in the phase winding, Ia, is controlled to also be negative. Conversely, for the interval, 120°–210°, the magnetic flux for phase winding A is increasing and the current Ia, is controlled to be positive. Similar switching arrangements are employed with the other phase windings as illustrated in FIG. 2.

Although not illustrated in FIG. 2, the magnitudes of the currents flowing in the phase windings may be adjusted or controlled by traditional methods (e.g., open or closed loop pulse-width-modulation control, hysteresis control or any other appropriate method) to control the average output torque.

Figure 3:
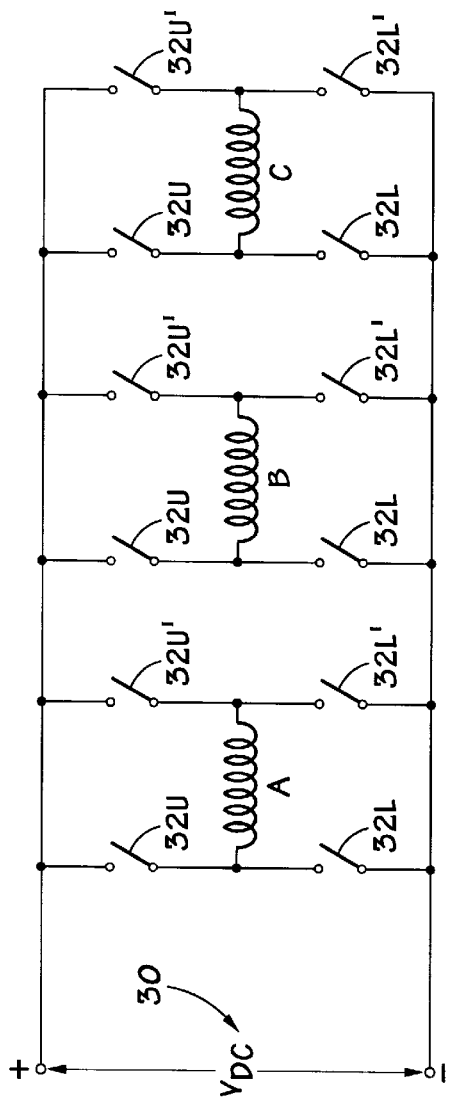
FIG. 3 illustrates an H-bridge drive that may be used to drive the machine of FIG. 1.

Many different drives may be used to provide the switching scheme of FIG. 2. One such drive is a traditional full H-bridge drive as illustrated in FIG. 3. In this drive a DC voltage Vdc is provided across a DC bus 30 from a DC source such as a battery or an AC-DC converter. Four power switching devices, including upper devices 32u and 32u' and lower devices 32l and 32l', couple each of the three phase windings A, B and C across the DC bus. The power switching devices 32u, 32u', 32l and 32l' may be any suitable switching devices such as MOSFETs, bi-polar junction transistors, power MOSFETs, IGBTs, mechanical switches or the like. In general, actuation of two of the power switching devices (one upper and one lower) into a conductive (or "closed") condition will cause current to flow through the phase windings. By adjusting which power switching devices are actuated, the polarity of the current can be controlled. For example, with respect to phase A, actuation of power switching devices 32u and 32l' into a conductive condition will cause current to flow from left to right in FIG. 3. Alternately, actuation of power switching devices 32u' and 32l into a conductive condition will cause current to flow from right to left.

The gating (switching) signals to the power switching devices 32u, 32u', 32l and 32l' may be controlled using known techniques to control the magnitude of the current in the phase windings.

The construction of control circuitry to actuate the power switching devices 32u, 32u', 32l and 32l' is well within the ability of one of ordinary skill in the art having the benefit of this disclosure and will not be further discussed.

While allowing for implementation of the maximum switching scheme of FIG. 2, the H-drive illustrated in FIG. 3 is not of the type commonly used with switched reluctance machines. In general, most drives for switched reluctance machines are designed to provide unidirectional currents only and do not include a full set of four power switching devices for each phase winding. Thus, the H-bridge drive of FIG. 3 is not the type of drive one would encounter in a "retro-fit" situation where one replaced rotor of a given traditional reluctance machine in an existing system with a reluctance/permanent magnet rotor such as rotor 14 of FIG. 1.

Figure 4B:
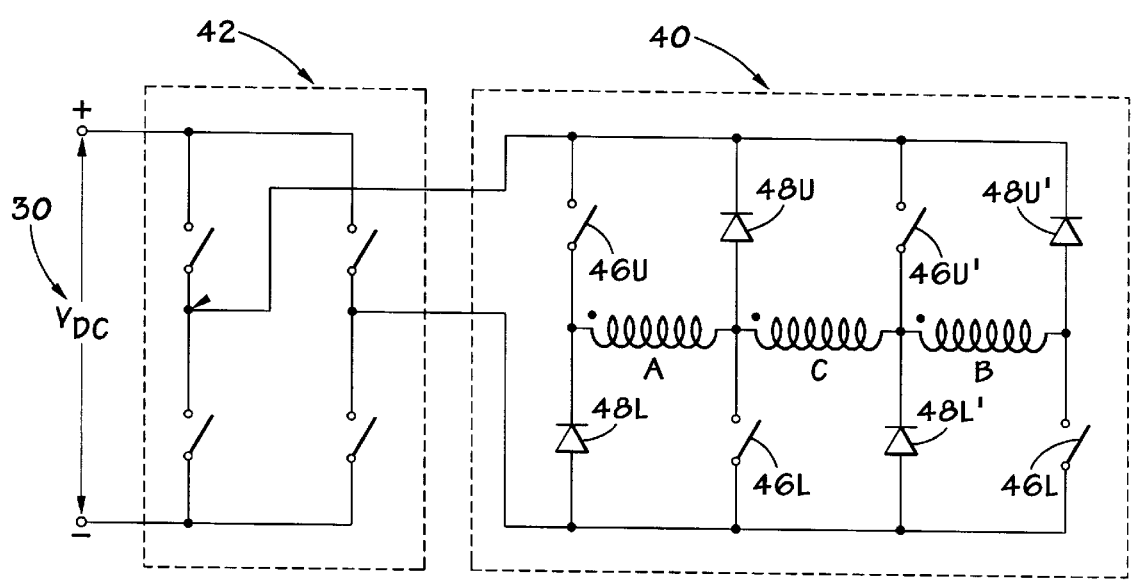
FIGS. 4A and 4B illustrate alternate drives that may be used to drive the machine of FIG. 1, each including a front-end converter.
Figure 4A:
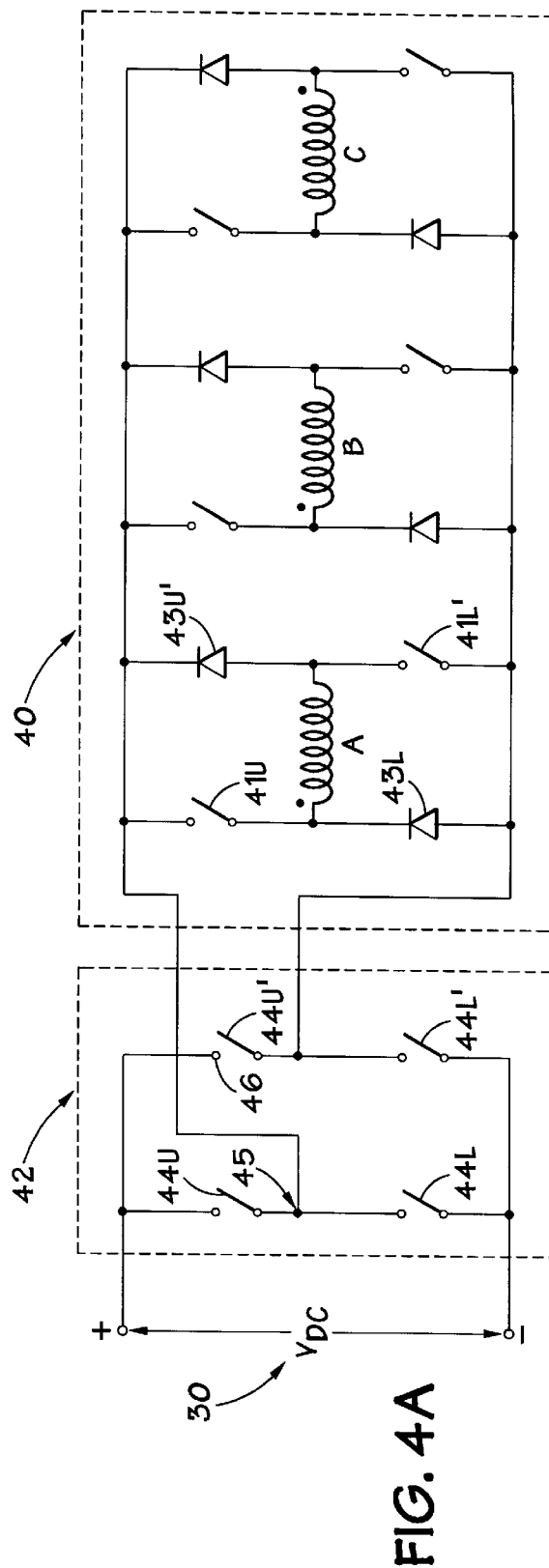

FIGS. 4A and 4B illustrate drives of the present invention that may be used with the machine 10 of FIG. 1 to implement the bi-directional switching scheme of FIG. 2. The drives of FIGS. 4A and 4B are particularly applicable to retro-fit situations where a traditional reluctance machine is already coupled to a traditional drive. In general, the drives of FIGS. 4A and 4B comprise traditional switched reluctance drives 40 to which a front end converter and appropriate converter switching circuitry (not illustrated) is added 42.

Referring to FIG. 4A, a standard uni-polar switched reluctance drive 40 is illustrated wherein, for each winding, an upper power switching device 41u and a lower power switching device 41l is provided. The power switching devices 41u and 41l may be of the same construction as power switching devices 32 of FIG. 3. Also associated with each phase winding are upper and lower flyback diodes 43l and 43u. Associated with traditional drive 40 would be switching circuitry for monitoring the angular position of the rotor and generating appropriate actuating signals for the power switching devices 41u and 41l.

As those of ordinary skill in the art will appreciate, the switched reluctance drive 40 of FIG. 4A is typically coupled across a DC bus and operated to provide uni-directional current to the various phase windings. In the embodiment of FIG. 4A, however, a converter 42, consisting of four power switching devices 44u, 44u', 44l and 44l', is coupled across a DC bus 30. The output nodes of the power converter 45 and 46 are coupled across the bus provided to the traditional drive 40. By appropriately actuating the power switching devices that comprise converter 42, it is possible to reverse the polarity of the voltage provided to the bus of drive 40. For example, if power switching devices 44u and 44l' are actuated into a closed position, the positive DC bus voltage across bus 30 will be provided to the drive 40. If, however, switches 44l and 44u' are actuated into a closed position, then the negative of the DC bus 30 will be applied to the bus of drive 40.

Because the switching scheme for the reluctance machine 10 of FIG. 2 differs from the standard switching scheme used with reluctance motors primarily in that the phase currents vary from positive to negative polarity, the drive of FIG. 4A provides a simple way of converting a standard drive to a drive that can be used with the machine of FIG. 10. Thus, a standard existing system including a drive 40 and a traditional reluctance machine may be used to implement the system of the present invention without substantial modification. First the rotor of the traditional machine may be replaced with a rotor/permanent magnet assembly as taught above, and second the converter 42 and its associated control circuitry must be added to the existing controller. The bulk of the circuitry of controller 40, including any control circuitry designed to control the torque output of the machine, may be used to provide the switching scheme of FIG. 2 by simply coupling the drive to a converter 42 as illustrated in FIG. 4A and controlling FIG. 42 to reverse the polarity of the DC bus provided to the drive 40 at the appropriate times.

FIG. 4B illustrates another arrangement of a power converter 42 and a standard reluctance machine drive 40. In the example of FIG. 4B, the standard reluctance drive includes only four power switching devices 46u, 46u', 46l and 46l' and four flyback diodes 48u, 48u', 48l and 48l'. Operation of the drive 40 and the power converter 42 for the example of FIG. 4B is generally the same as that previously described in connection with FIG. 4A and should be apparent to one of ordinary skill in the art having the benefit of this disclosure.

Figure 5:
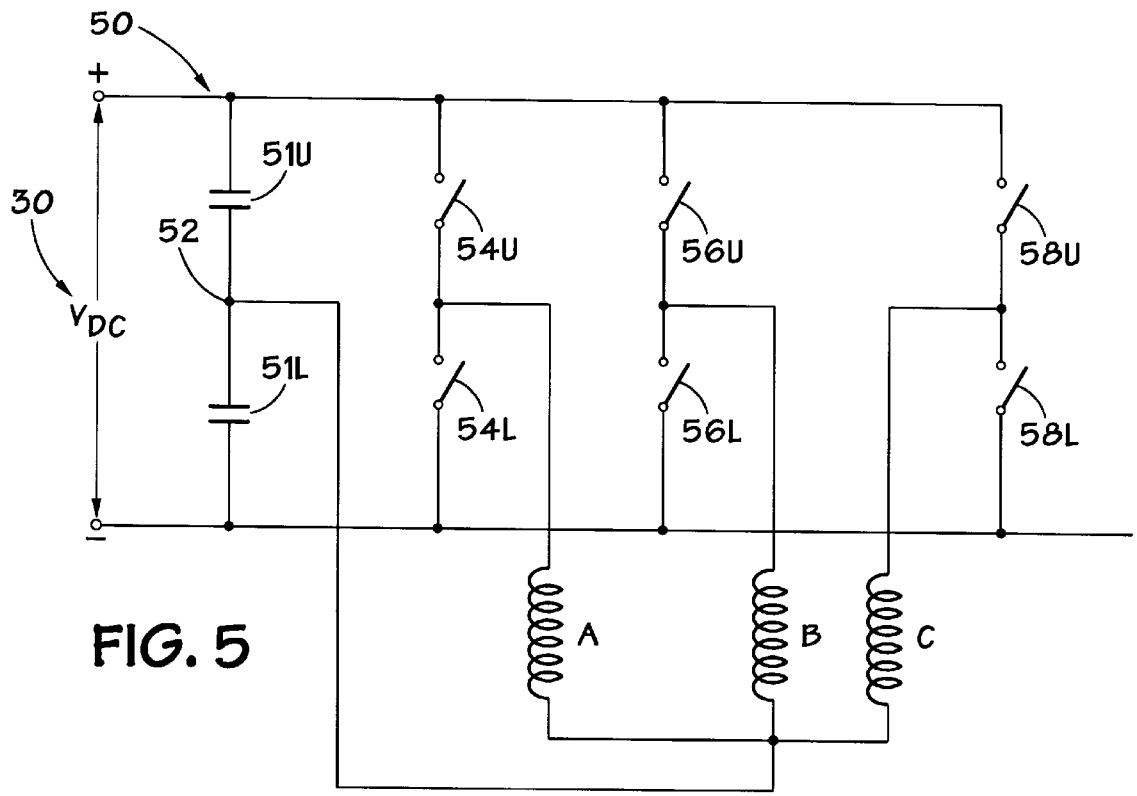
FIG. 5 illustrates a bi-polar drive with a neutral point between the DC bus that may be used to drive the machine of FIG. 1.

FIG. 5 illustrates a bi-polar drive 50 with a neutral point between the DC bus that may be used to provide bi-polar currents to the phase windings of the machine 10 of FIG. 1 in accordance with the switching scheme of FIG. 2. In this embodiment, a DC voltage is provided across a DC bus 30. Coupled across the DC bus are upper and lower DC capacitors 51u and 51l. The common node 52 between the upper and lower capacitors 51u and 51l is brought out and coupled to a common connection between the three phase windings A, B and C. The other ends of each of the three phase windings are coupled to switching arraignments that coupled the other end of the windings to the upper rail of the DC bus (via power switching device 54u for phase A, 56u for phase B and 58u for phase C) and to the lower rail of the DC bus (via power switching device 54l for phase A, 56l for phase B, and 56l for phase C).

By appropriately activating the devices 54, 56 and 58 it is possible to establish bi-polar currents in the phase windings. For example, with respect to phase A it is possible to induce current that will flow from top to bottom in FIG. 5 by activating into a closed position power switching device 54u. Conversely, power switching device 54l can be actuated into a closed position to induce current flow in the opposite direction. The appropriate switching sequence to implement the switching scheme of FIG. 2 should be apparent.

Figure 6:
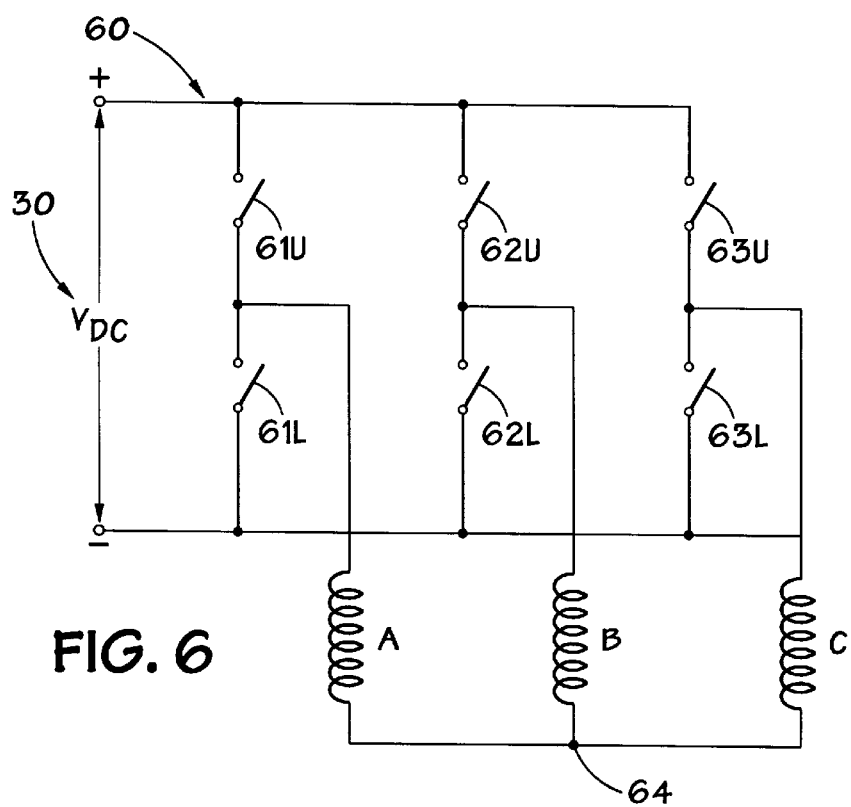
FIG. 6 illustrates a drive that may be used to drive the machine of FIG. 1 such that current flows through two phase windings simultaneously.

FIG. 6 illustrates yet another drive 60 that may be used to drive machine 10 of FIG. 1. In this embodiment, one set of ends of the three phase windings are coupled to a common node 64 and the other ends of the phase windings are coupled across a DC bus by power switching devices 61u, 61l (for phase A); 62u, 62l. (for phase B); 63u, 63l (for phase C). By actuating two switches in a conductive condition it is possible to establish bi-directional current in any two phase windings.

Because of the nature of the common connection at node 64, it is impossible to have phase current flowing in only a single phase winding with drive 60; current will always be flowing through two phase windings simultaneously. For example, if power switching devices 61u and 62l are actuated into a closed position, the current will flow through both phase windings A and B. If switches 61u and 63l are closed, then current will flow through phase windings A and C.

Because drive 60 cannot establish current in only a single winding, it cannot be used to implement the switching scheme of FIG. 2. Moreover, one result of using drive 60 to drive the machine 10 of FIG. 1 is that the reluctance torque produced by the machine is reduced to zero. This is because the reluctance torque produced by one of the energized phase windings is canceled out by a negative reluctance torque produced by the other energized phase winding. As such, the drive 60 should be used when only the permanent magnet torque output of the machine is desired.

The preceding discussions of the drives illustrated in FIGS. 3, 4A-4B, 5 and 6 assumed that the switching scheme used to implement the currents in the phase windings of the reluctance machine 10 was such that the currents took the form of generally rectangular pulses having a duration corresponding to the stator pole span as illustrated in FIG. 2. The construction and control of such drives is relatively straightforward and easier to implement that the switching schemes commonly used with other motors having permanent magnets affixed to the rotor, such as a traditional permanent magnet motor having distributed windings.

In addition to providing rectangular current pulses, the previously discussed drives of FIGS. 3, 4A-4B, 5 and 6 can be used to provide pulse width modulation excitation to the phase windings by switching the appropriate power switching devices according to known methods for producing sinusoidal phase currents. When such switching schemes are used the reluctance torque produced by the machine is reduced to zero and all of the torque is produced by the interaction of the permanent magnets and the phase currents. Operation of the reluctance machine 10 in this "sinusoidal" mode should be used only when magnetic torque is desired.

As explained above the six stator pole/four rotor pole arrangement of the machine 10 of FIG. 1 is exemplary only and other stator pole/rotor pole combinations are envisioned. One such alternate arrangement is illustrated in FIG. 7 which presents a reluctance machine 70 in accordance with the present invention having eight stator poles and six rotor poles.

In general, the machine 70 may be constructed using the same techniques previously described in connection with machine 10 of FIG. 1. The machine 70 comprises a stator 72 defining eight stator poles. Placed around the eight stator poles are four phase windings A, B, C and D such that the stator poles form four stator pole pairs 72a, 72b, 72c and 72d. The coils comprising windings A, B, C and D are positioned such that the polarities of the magnetic field established when the phase windings are energized are in accordance with the arrows in FIG. 7. The same convention used with respect to FIG. 1 is used in FIG. 7.

The rotor 74 of machine 70 comprises a stack of laminations defining six poles and six inter-pole gaps. Permanent magnets of north polarity 74n and south polarity 74s are placed in the inter-pole gaps as illustrated in FIG. 7.

Figure 7:
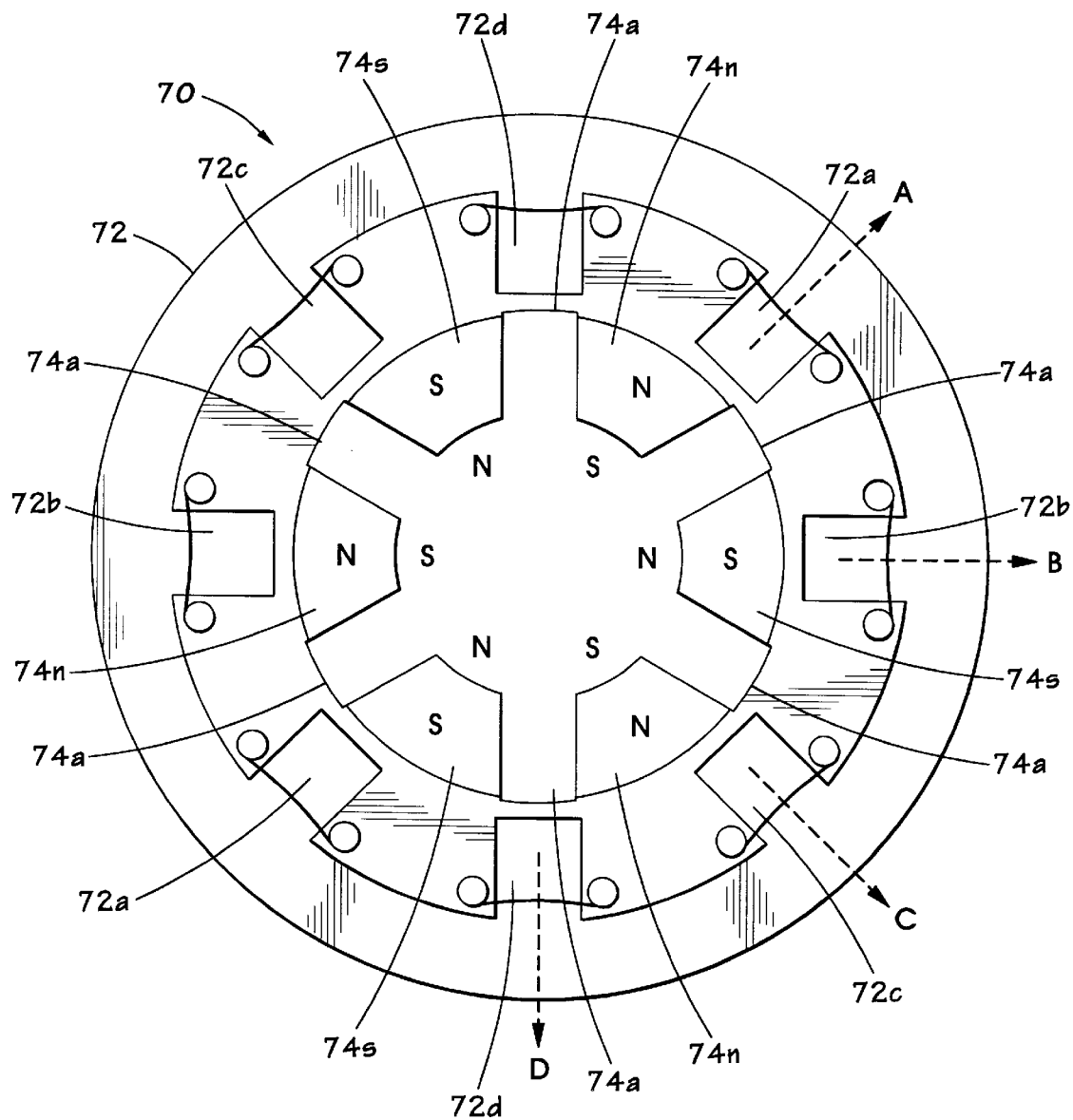
FIG. 7 illustrates an alternate embodiment of a reluctance machine in accordance with the Present invention having eight stator poles and six rotor poles.

It may be noted that the permanent magnets in the inter-pole gaps of FIG. 7 alternate between polarities while they do not in the embodiment of FIG. 1. In general, the permanent magnets should be arranged such that a given permanent magnet has a permanent magnet of opposite polarity located at the position 180° electrical degrees opposite the given pole of the rotor. Since there are only four rotor poles in the embodiment of FIG. 1, a non-alternating scheme is required to ensure that the permanent magnets at positions 180° electrical apart are of opposite polarities, while an alternating scheme may be used in the embodiment of FIG. 7.

The drives of FIGS. 3, 4A, 4B, 5 and 6 may be used—as modified for a four phase machine—to drive the machine of FIG. 7.

Figure 8:
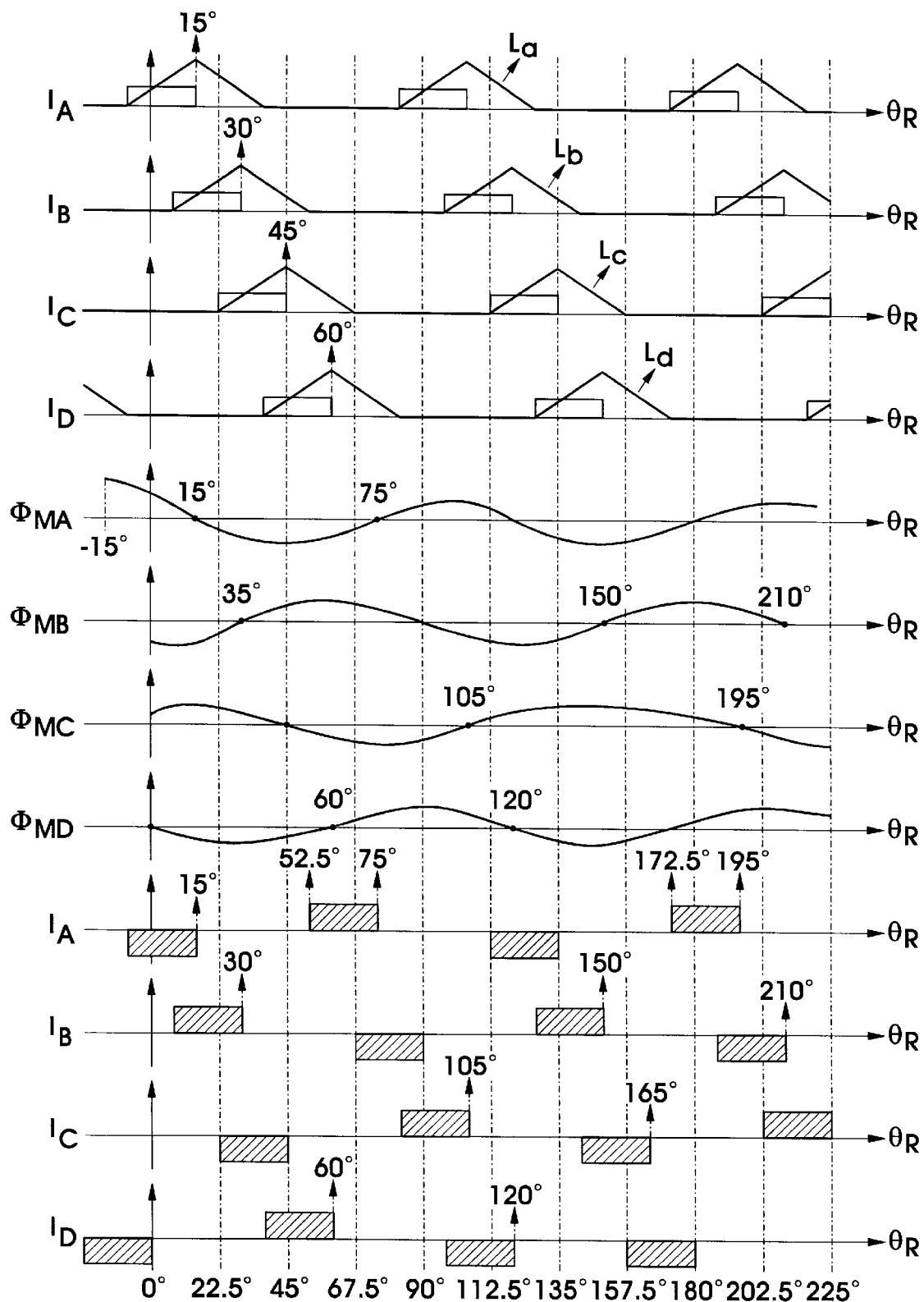
FIG. 8 illustrates exemplary inductance, magnetic flux and current waveforms for the machine of FIG. 7.

FIG. 8 illustrates exemplary inductance, permanent magnet flux and current waveforms for the machine 70 of FIG. 7. Because of the four-phase nature of machine 70, the phase currents of FIG. 8 overlap without producing any decrease in the net torque output. The exemplary current waveforms of FIG. 8 provide for maximum torque output.

The above description of several exemplary embodiments is made by way of example and not for purposes of limitation. Many variations may be made to the embodiments and methods disclosed herein without departing from the scope and spirit of the present invention. For example, the present invention is applicable to reluctance machines having N·6 stator poles and N·4 rotor poles or N·8 stator poles and N·6 rotor poles where N is an integer greater than or equal to 1. The present invention is intended to be limited only by the scope and spirit of the following claims.

I claim as my invention:

1. A rotor for a switched reluctance machine comprising:
   (a) a stack of non-magnet rotor laminations, the stack of non-magnet rotor laminations defining N*4 rotor poles, where N is an integer greater than or equal to 1, the rotor poles defining at least two inter-pole gaps positioned 180 mechanical degrees apart; and
   (b) at least two permanent magnet inserts, each of the inter-pole gaps having one of the permanent magnet inserts positioned therein with the radially-directed magnetic orientation of the permanent magnet inserts arranged such that one of the permanent magnet inserts has a north-pole magnetic polarity and the other permanent magnet has a south-pole magnetic polarity.

2. The rotor of claim 1 wherein the contour of the permanent magnet inserts matches the counter of the rotor poles.

3. The rotor of claim 1 wherein the at least two inter-pole gaps comprise N*4 inter-pole gaps, where any given one of the N*4 inter-pole gaps has a corresponding interpole gap located 180 mechanical degrees from the given one of the N*4 inter-pole gaps.

4. A switched reluctance machine comprising:
   a stator defining a plurality of stator poles, wherein the span of each stator pole is the same and is equal to approximately Π/Ps mechanical degrees, where Ps is the number of stator poles;
   a plurality of phase windings placed about the stator poles;
   a stack of non-magnet rotor laminations forming a rotor, the rotor defining a plurality of rotor poles and at least two inter-pole gaps positioned 180 mechanical degrees apart, wherein the span of each rotor pole is approximately equal to the span of each stator pole and wherein the span of each inter-pole gap is greater than the span of each stator pole, the rotor positioned to rotate with respect to the stator; and
   at least two permanent magnet inserts, each of the at least two inter-pole gaps having one of the permanent magnet inserts positioned therein with the radially-directed magnetic orientation of the permanent magnet inserts arranged such that one of the permanent magnet inserts has a north-pole magnetic polarity and the other permanent magnet has a south-pole magnetic polarity.

5. The switched reluctance machine of claim 4 wherein the stator defines N·6 stator poles and the rotor defines N·4 rotor poles, where N is an integer greater than or equal to 1.

6. The switched reluctance machine of claim 5 wherein there are three phase windings.

7. The switched reluctance machine of claim 4 wherein the stator defines N·8 stator poles and the rotor defines N·6 rotor poles, where N is an integer greater than 1.

8. The switched reluctance machine of claim 7 wherein there are four phase windings.

9. The switched reluctance machine of claim 4 wherein each of the non-magnet rotor laminations is formed from steel.

10. The switched reluctance machine of claim 4 wherein the at least two inter-pole gaps comprises a number of inter-pole gaps equal to the number of rotor poles, where any given one of the at least two inter-pole gaps has a corresponding interpole gap located 180 mechanical degrees from the given one of the at least two inter-pole gaps.

11. A reluctance machine system comprising:
   a switched reluctance machine including a stator defining a plurality of stator poles, wherein the span of each stator pole is substantially the same; a plurality of phase windings wound around the stator poles; a stack of non-magnet rotor laminations forming a rotor, the rotor defining a plurality of rotor poles and a plurality of inter-pole gaps, wherein the span of each inter-pole gap is greater than the span of each rotor pole and wherein the span of each inter-pole gap is greater than the span of each stator pole, and a plurality of permanent magnet inserts, each of the interpole gaps having at least one permanent magnet insert positioned therein, wherein each phase winding defines a phase inductance and a permanent magnet flux curve that vary with rotation of the rotor with respect to the stator, the phase inductance reaching a maximum when a pair of the plurality of rotor poles aligns with a pair of the plurality of stator poles; and
   a drive circuit comprising a main drive bus for receiving electric power and a plurality of power switching devices coupling the main drive bus to the phase windings, the drive circuit controlling the energization of at least one phase winding such that the polarity of the current flowing through the phase winding during intervals of increasing phase inductance is of the same polarity as the slope of the permanent magnet flux curve for that winding over that interval.

12. The reluctance machine system of claim 11, wherein the drive circuit controls the energization of each phase winding such that the polarity of the current flowing through each phase winding during intervals of increasing phase inductance is of the same polarity as the slope of the permanent magnet flux curve for that winding over that interval.

13. The system of claim 11 wherein the main drive bus is a DC bus and where each phase winding is coupled across the main drive bus by four power switching devices arranged in an H-bridge configuration.

14. The system of claim 11 wherein the drive circuit comprises:
   a DC bus providing DC power, the DC bus defining upper and lower rails;
   a first capacitor having a first end coupled to the upper rail of the DC bus and a second end;
   a second capacitor having a first end coupled to the second end of the first capacitor and a second end coupled to the lower rail of the DC bus;
   an electrical connection between the junction of the first and second capacitors and a common node to which one end from each of the phase windings is coupled; and upper and lower power switching devices for each phase winding; the upper switching device for a given phase winding coupling other end of the phase winding to the upper rail of the DC bus and the lower switching device for the given winding coupling the other end phase winding to the lower rail of the DC bus.

15. The system of claim 11, wherein one end from each of the phase winding is coupled to a common node and wherein the drive circuit comprises:

a DC bus providing DC power, the DC bus defining upper and lower rails; and upper and lower power switching devices for each phase winding; the upper switching device for a given phase winding coupling the other end of the phase winding to the upper rail of the DC bus and the lower power switching device coupling the other end of the phase winding to the lower rail of the DC bus.

16. The system of claim 11 where there are six stator poles, four rotor poles and three phase windings.

17. The system of claim 11 where there are eight stator poles, six rotor poles and four phase windings.

18. The system of claim 11 wherein the drive circuit comprises:

a source of DC voltage providing a DC bus;

a power converter having its inputs coupled to the source of DC power;

a switched reluctance drive circuit having its bus inputs coupled to the outputs of the power converter, wherein the main drive bus is the bus of the switched reluctance drive.

19. The system of claim 18 wherein the switched reluctance drive comprises two power switching devices and two flyback diodes for each phase winding, wherein the main drive bus comprises an upper rail and a lower rail, and wherein one end of each phase winding is coupled to the upper rail via a power switching device and to the lower rail via a flyback diode and wherein the other end of each phase winding is coupled to the upper rail via a flyback diode and to the lower rail via a power switching device.

20. The system of claim 18 wherein the switched reluctance drive comprises N+1 power switching devices and N+1 flyback diodes, where N is an integer and N is the number of phase windings.

21. The system of claim 11 wherein each of the inter-pole gaps has one permanent magnet insert positioned therein.

* * * * *